United States Patent [19]

Tanaka et al.

[11] Patent Number: 4,800,411
[45] Date of Patent: Jan. 24, 1989

[54] MAGNETIC BRUSH DEVELOPMENT DEVICE FOR ELECTROSTATIC LATENT IMAGES

[75] Inventors: Masaru Tanaka; Seiji Oka, both of Yokohama, Japan

[73] Assignee: Ricoh Company, Ltd., Tokyo, Japan

[21] Appl. No.: 37,193

[22] Filed: Apr. 10, 1987

[30] Foreign Application Priority Data

| Apr. 10, 1986 | [JP] | Japan | 61-54041[U] |
| Apr. 16, 1986 | [JP] | Japan | 61-56897[U] |
| Apr. 16, 1986 | [JP] | Japan | 61-87716 |
| Apr. 18, 1986 | [JP] | Japan | 61-59003 |

[51] Int. Cl.$^4$ .......................................... G03G 15/08
[52] U.S. Cl. .............................. 355/3 DD; 355/14 D; 118/653
[58] Field of Search .................... 355/3 DD, 14 D, 30; 118/651, 653, 656, 657, 658

[56] References Cited

U.S. PATENT DOCUMENTS

| 4,264,190 | 4/1981 | Tsuda et al. | 118/652 X |
| 4,453,493 | 6/1984 | Sawayama et al. | 118/658 |
| 4,468,111 | 8/1984 | Yamagata et al. | 355/3 DD |
| 4,583,112 | 4/1986 | Morano et al. | 355/3 DD |
| 4,592,653 | 6/1986 | Ikeda et al. | 355/14 D X |

FOREIGN PATENT DOCUMENTS

| 2947235 | 4/1981 | Fed. Rep. of Germany ... | 355/3 DD |
| 60-95566 | 5/1985 | Japan | 355/3 DD |

Primary Examiner—A. C. Prescott
Assistant Examiner—Jane Lau
Attorney, Agent, or Firm—Oblin, Fischer, Spivak, McClelland & Maier

[57] ABSTRACT

A magnetic brush development device has a development casing housing a development sleeve for carrying a magnetic brush thereon, the development sleeve confronting an electrostatic latent image carrier such as a photosensitive drum. When the development sleeve rotates, toner carried by the development sleeve acts as a pump for air inside the development casing housing, and the pumping action of the air causes developer to be scattered out of the housing. However, according to the invention, the development casing has spaces defined therein around the development sleeve and communicating with each other to equalize pressures therein for thereby preventing developer from being scattered out.

7 Claims, 7 Drawing Sheets (a)

MAGNETIC BRUSH DEVELOPMENT DEVICE FOR ELECTROSTATIC LATENT IMAGES

BACKGROUND OF THE INVENTION

1. Field of the Invention

The present invention relates to an image development device for use with an electrostatic latent image carrier, and more particularly to a magnetic brush image development device for use in an electrophotographic copying machine, an electrostatic printing machine, or other recording apparatus.

2. Description of the Prior Art

Conventional magnetic brush development devices generally have a plurality of permanent magnets fixedly disposed in a nonmagnetic sleeve, with adjacent permanent magnets having opposite polarities. When the sleeve rotates, a two-component developer composed of toner and a magnetic carrier is delivered as a magnetic fiber brush on the sleeve toward an electrostatic latent image carrier. Since the developer attached to the sleeve is too much, its amount is limited by a limiting plate called a doctor blade.

One such conventional magnetic brush development device is hereinafter explained with reference to FIG. 21 of the accompanying drawings.

As shown in FIG. 21, a photosensitive drum 1 serving as an electrostatic latent image carrier is driven to rotate about its own axis in the direction of the arrow. A magnetic brush development device 2 disposed in confronting relation to the photosensitive drum 1 comprises a development sleeve 3, a development casing 4, a doctor blade 5, magnets 6, a toner fiber limiting plate 7, an inlet seal member 8, and other members.

The development sleeve 3 comprises a nonmagnetic cylindrical body having its peripheral surface close to the photosensitive drum 1 and being rotatable so that its portion facing the photosensitive drum 1 moves in the same direction (indicated by the arrow) as the direction in which the confronting portion of the photosensitive drum 1 moves. The development sleeve 3 houses therein a group of magnets such as the magnets 6, a development main pole 6a, delivery magnets 6b, 6c, etc, which are fixed in position.

The doctor blade 5 is positioned closely to the peripheral surface of the development sleeve 3. The doctor blade 5 serves to limit the amount of a developer moving with the development sleeve 3—i.e., the amount of the developer to be supplied to the photosensitive drum 1. The toner fiber limiting plate 7 is located downstream of the doctor blade 5 in the direction of travel of the developer. The toner fiber limiting plate 7 covers as a roof-like member a portion of the peripheral surface of the development sleeve 3 for holding down toner fibers of the developer on the peripheral surface of the development sleeve 3 thereby to preventing the developer from being scattered. The doctor blade 5 and the toner fiber limiting plate 7 are integrally molded as a single-piece doctor member 9. The inlet seal member 8 is positioned above the doctor member 9 and has a distal end extending toward the photosensitive drum 1. A brush 8a of bristles attached to the distal end of the inlet seal member 8 in any known manner is held against a portion of the peripheral surface of the photosensitive drum 1 for preventing the toner from being scattered out of the magnetic brush development device 2. A scoop-up roller 10 for supplying the developer is disposed in confronting relation to the development sleeve 3. The scoop-up roller 10 has a number of radial blades for retaining the developer therebetween and supplying the developer to the development sleeve 3 upon rotation in the direction of the arrow.

The development sleeve 3 and the scoop-up roller 10 are rotatably housed in the development casing 4, which has an opening facing the photosensitive drum 1. The development casing 4 also has an opening defined in an upper righthand portion thereof and coupled to a toner supply tank 11. The toner supply tank 11 supplies toner T to the scoop-up roller 10 in response to rotation of a supply roller 12 in the toner supply tank 11. The toner T can be supplied to the toner supply tank 11 from a toner hopper 13. The toner T within the toner supply tank 11 is agitated by an agitator 14 at all times.

The toner T supplied by the scoop-up roller 10 to the development sleeve 3 in the development casing 4 is mixed with magnetic particles known as a carrier, and then forms a magnetic brush under magnetically attractive forces from the delivery magnets 6b, 6c. The magnetic brush is moved toward the photosensitive drum 1 as the development sleeve 3 is rotated.

A first space A is surrounded by the doctor blade 5, the toner fiber limiting plate 7, and a portion of the peripheral surface of the development sleeve 3. A second space B is surrounded by the inlet seal member 8, the toner fiber limiting plate 7, a portion of the peripheral surface of the development sleeve 3, and a portion of the peripheral surface of the photosensitive drum 1. Air flows between the first and second spaces A, B as follows: When the development sleeve 3 rotates in the direction of the arrow, the developer that has been held down by the toner fiber limiting plate 7 serves as a pump for delivering air from the first space A into the second space B. As air is thus delivered, the air pressure in the second space B is increased, and higher-pressure air in the second space B tends to flow through a portion of the inlet seal member 8 with a less sealing capability out of the development casing 4.

The above problem is solved by a magnetic brush development device disclosed in Japanese Laid-Open Patent Publication No. 59-101676. The disclosed development device has a pump for drawing air out of a space corresponding to the second space B, thereby preventing an air-pressure buildup in that space. However, the proposed arrangement is disadvantageous in that it not only requires a pump but also needs a relatively large area to install the pump therein.

In the unitized development device as described above, an air flow (hereinafter referred to as a "wake") is produced around the scoop-up roller 10 and the development sleeve 3 as they are rotated. The wake increases the air pressure within the development casing 4, and it causes some of the toner to be scattered out of the development unit on an air stream flowing from the development casing 4.

The toner is mainly apt to flow out of the development unit through a gap between the development sleeve 4 and the development casing 3. In general, no magnetic brush is normally formed at each end of the development sleeve 3. Therefore, the gap between the development casing 4 and each end of the development sleeve 3 is larger, as no magnetic brush toner fiber is present at each end of the development sleeve 3. As a consequence, toner particles tend to be forced through the opposite ends of the development sleeve 3 and scattered out of the development unit.

When the developer is scattered out of the development unit, it floats in the recording apparatus and contaminates various other components therein. If an image transfer charger is contaminated by such floating developer particles, a defective image may be produced.

To prevent the developer from being scattered out through the gaps at the opposite ends of the development sleeve 3, many development device designs have seal members attached to the development casing 4 in covering relation to the opposite ends of the development sleeve 3. However, floating toner particles are liable to be deposited on the seal members, and such a toner deposit is caused to drop by an air flow produced by the rotation of the photosensitive drum 1, thus scattering toner particles around. It would be difficult to form a suitable gap between the outer end of the magnetic brush on the development sleeve 3 and the inner edges of the seal members. Thus, the magnetic brush is displaced by the seal members to cause the toner to be scattered out and drop onto the image transfer charger, for example, disposed below the development device, resulting in a leakage or other failure. Alternatively, the outer end of the magnetic brush and the seal members may be spaced too apart from each other, failing to prevent the toner from scattering out.

One solution to the above problem has been to define a pressure relief hole in the development casing 4 and provide a filter in the pressure relief hole for preventing the developer from flowing out therethrough. The conventional filter structure is however disadvantageous in that it tends to be clogged soon, quickly reducing the pressure relieving capability thereof.

OBJECT OF THE INVENTION

It is an object of the present invention to provide a magnetic brush development device which has an air passage providing communication between two spaces defined in a development casing, so that toner is prevented from being ejected out of the magnetic brush development device and floating toner particles are prevented from being produced without increasing the size of the device and complicating the structure of the device.

SUMMARY OF THE INVENTION

According to the present invention, there is provided a magnetic brush development device comprising a development sleeve disposed closely to the peripheral surface of an electrostatic latent image carrier, a development casing housing the development sleeve and storing a two-component developer, a doctor blade disposed closely to the peripheral surface of the sleeve for limiting the amount of the developer to be supplied to the electrostatic latent image carrier, a fiber limiting plate positioned downstream of the doctor blade in the direction of movement of the developer for limiting erected fibers of the developer, and an inlet seal member extending from the development casing toward the electrostatic latent image carrier and having a distal end held against the peripheral surface of the electrostatic latent image carrier. An air flow passage provides communication between a first space surrounded by the doctor blade, the fiber limiting plate, and a portion of the peripheral surface of the development sleeve and a second space surrounded by the inlet seal member, the fiber limiting plate, a portion of the peripheral surface of the development sleeve, and a portion of the peripheral surface of the electrostatic latent image carrier.

Alternatively, an air flow passage provides communication between a first vacuum space surrounded by the fiber limiting plate and a portion of a magnetic brush held against the fiber limiting plate and a second vacuum space surrounded by the magnetic brush held against the peripheral surface of the electrostatic latent image carrier and a portion of the inner surface of the development casing and by a portion of the inner surface of the development casing in a developing region and downstream of the developing region. The seal member has an air inlet communicating with the second space downstream of the doctor blade, the development casing having an opening having an edge spaced from the peripheral surface of the electrostatic latent image carrier by a gap $DC_G$ selected to be in the range of:

$$0.3 \text{ mm} < DC_G \leqq 1.0 \text{ mm}$$

As a further alternative, the development casing has a pressure relief hole for reducing an air pressure therein, and a filter is disposed in the pressure relief hole for preventing the developer from being scattered out. The filter is in the form of a dual structure comprising a first inner filter for reducing the speed of an air flow and a second outer filter for preventing the developer from being scattered, the peripheral surface of the electrostatic latent image carrier being spaced from an edge of an opening in the development casing through which the development sleeve is exposed toward the electrostatic latent image carrier by a gap $\delta$ selected to meet the dimensional relationship:

$$\delta - D_G < 1.5 \text{ mm}$$

where $D_G$ is the thickness of a magnetic brush on the development sleeve.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PRESENTLY PREFERRED EMBODIMENTS

Figure 1:
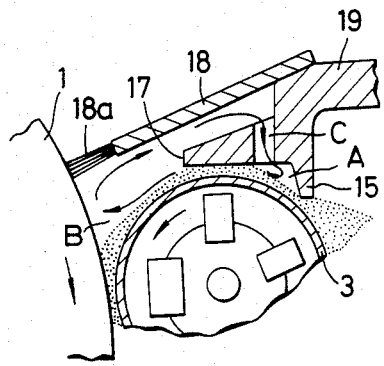
FIG. 1 is an enlarged fragmentary cross-sectional view of a magnetic brush development device according to a first embodiment of the present invention.

Like or corresponding parts are denoted by like or corresponding reference characters throughout several views.

As shown in FIG. 1, a photosensitive drum 1 serving as an electrostatic latent image carrier is rotatable about its own axis in the direction of the arrow. A development sleeve 3 disposed closely to the peripheral surface of the photosensitive drum 1 is rotatable about its own axis in the direction of the arrow. A doctor blade 15 is positioned near the peripheral surface of the development sleeve 3. A toner fiber limiting plate 17 is located downstream of the doctor blade 15 in the direction of movement of a developer carried by the development sleeve 3. The doctor blade 15 and the toner fiber limiting plate 17 are formed as a unitary doctor member 19 on which there is mounted an inlet seal member 18 extending toward the photosensitive drum 1. The inlet seal member 18 supports on its distal end a brush 18a of bristles held against a portion of the peripheral surface of the photosensitive drum 1.

The doctor blade 15, the toner fiber limiting plate 17, and a portion of the peripheral surface of the development sleeve 3 jointly define and surround a first space A, whereas the the inlet seal member 18, the toner fiber limiting plate 17, a portion of the peripheral surface of the development sleeve 3, and a portion of the peripheral surface of the photosensitive drum 1 jointly define and surround a second space B. The toner fiber limiting plate 17 has at least one air flow passage C defined therethrough and providing communication between the first and second spaces A, B. The developer as it passes across and below the toner fiber limiting plate 17 functions as a pump for delivering air from the first space A into the second space B at all times. Therefore, a vacuum is developed in the first space A, drawing air from the second space B through the air flow passage C into the first space A as an air flow in the direction of the arrows. Therefore, the air flow passage C prevents an air pressure buildup in the second space B as it allows air to flow from the second space B into the first space A. Floating toner particles which are of small electric charges and hence not well attracted to the carrier are triboelectrically charged while passing through an area where the erected developer fibers are pressed against the toner fiber limiting plate 17. Thus, such floating toner particles become attracted to the carrier, with the result that the amount of floating toner is lowered and scattered toner is reduced.

Figure 2:
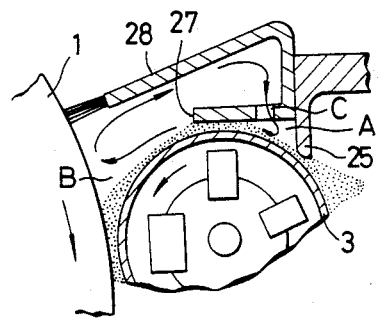
FIG. 2 is an enlarged fragmentary cross-sectional view of a magnetic brush development device according to a second embodiment of the present invention.

FIG. 2 shows a magnetic brush development device according to a second embodiment of the present invention. An inlet seal member 28 and a toner fiber limiting plate 27 are formed as a unitary member to which a doctor blade 25 is attached. The toner fiber limiting plate 27 has an air flow passage C for passing air from the second space B therethrough into the first space A.

Figure 3:
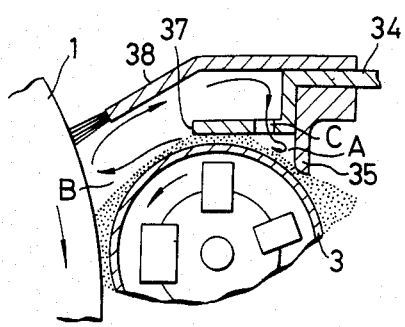
FIG. 3 is an enlarged fragmentary cross-sectional view of a magnetic brush development device according to a third embodiment of the present invention.

FIG. 3 illustrates a magnetic brush development device in accordance with a third embodiment of the present invention. A toner fiber limiting plate 37 is constructed as part of a development casing 34, and an inlet seal member 38 and a doctor blade 35 are mounted on the development casing 34. The toner fiber limiting plate 37 has an air flow passage C for allowing air to flow from the second space B therethrough into the first space A.

Figure 4:
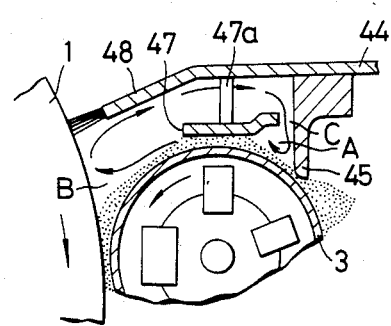
FIG. 4 is an enlarged fragmentary cross-sectional view of a magnetic brush development device according to a fourth embodiment of the present invention.

According to a fourth another embodiment shown in FIG. 4, an inlet seal member 48 is formed as part of a development casing 44 to which a doctor blade 45 and a toner fiber limiting plate 47 are attached. The toner fiber limiting plate 47 is fixed to the development casing 44 by means of a stay 47a. An air flow passage for passing air from the second space B into the first space A comprises a gap between the development casing 44 and the toner fiber limiting plate 47 across the stay 47a, and a gap between the doctor blade 45 and the toner fiber limiting plate 47.

Figure 5:
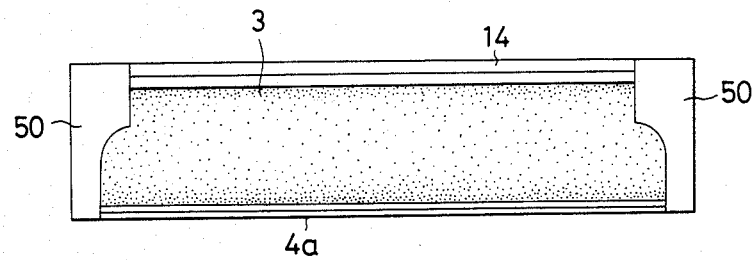
FIG. 5(a) is a front elevational view of a development casing opening as viewed from a photosensitive body.
FIG. 5(b) is a fragmentary cross-sectional view of a development sleeve near an end thereof.
Figure 5:
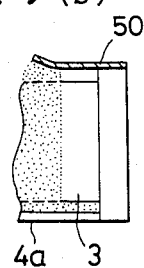

FIG. 5(a) shows an opening in the development casing 4 as viewed from the photosensitive drum 1. Side seals 50 are disposed at opposite ends of the opening in the development casing 4. The width of each of the side seals 50 is reduced at its lower end with which the development sleeve 3 is in sliding contact. FIG. 5(b) shows in cross section one end of the opening in the development casing 4. The side seal 50 and a lower edge 4a of the opening are held in sliding contact with the developer for preventing floating toner particles from leaking out of the development casing 4. Specifically, no magnetic brush is formed at the end of the development sleeve 3 as shown in FIG. 5(b).

Figure 6:
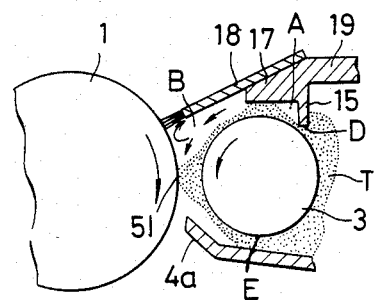
FIG. 6 is a fragmentary cross-sectional view showing the manner in which spaces are formed in a development device.

FIG. 6 illustrates the manner in which the developer moves on the peripheral surface of the development sleeve 3. The developer T is indicated as being stippled. An excessive mass of developer which is blocked by the doctor blade 15 is raised radially outwardly in a longitudinally central portion of the development sleeve 3. Therefore, the space in the development casing 4 is isolated from the space A by the distal end D of the doctor blade 15. The gap between the lower end E of the development sleeve 3 and the bottom of the development casing 4 is filled with the developer, which isolates the space in the development casing 4 from the exterior. The erected developer fibers are pressed against the toner fiber limiting plate 17 downstream of the doctor blade 15, permitting the space 15 to be defined by the doctor blade A, the toner fiber limiting plate 17, and the peripheral surface of the development sleeve 3. The developer fibers are also held in sliding contact with the photosensitive drum 1 in a developing region 51, thus allowing the space B to be defined between the toner fiber limiting plate 17 and the developing region 51. As no developer fibers are present at the opposite ends of the development sleeve 3, the spaces A, B are held in communication with each other by passages at the ends of the development sleeve 3.

Figure 7:
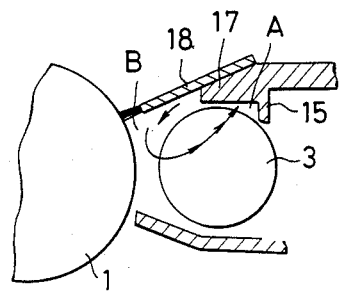
FIG. 7 is a fragmentary cross-sectional view showing an air flow passing through a passage defined at a sleeve end.
Figure 8:
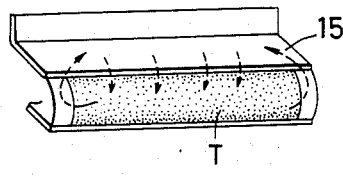
FIG. 8 is a perspective view explanatory of air flows.

As the development sleeve 3 is rotated, the developer held in sliding contact with the doctor blade 15 and the toner fiber limiting plate 17 functions as a pump for delivering air downstream from the space A, creating a vacuum in the space A. The air from the space A flows into the space B in the direction of the arrow. At the opposite ends of the development sleeve 3, air flows from the space B into the space A as shown in FIGS. 7 and 8. Since floating toner particles are also delivered on such an air flow into the space A, the floating toner is prevented from being scattered out of the development device. The toner that has been sent into the space A is triboelectrically charged by passing through an area where the developer fibers are pressed against the doctor blade 15, so that the toner is more liable to be attracted to the carrier and less liable to be scattered around.

Figure 9:
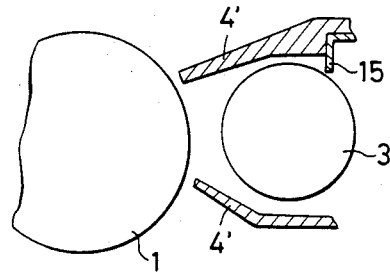
FIG. 9 is a fragmentary cross-sectional view showing a casing having an end extended in place of an inlet seal.
Figure 10:
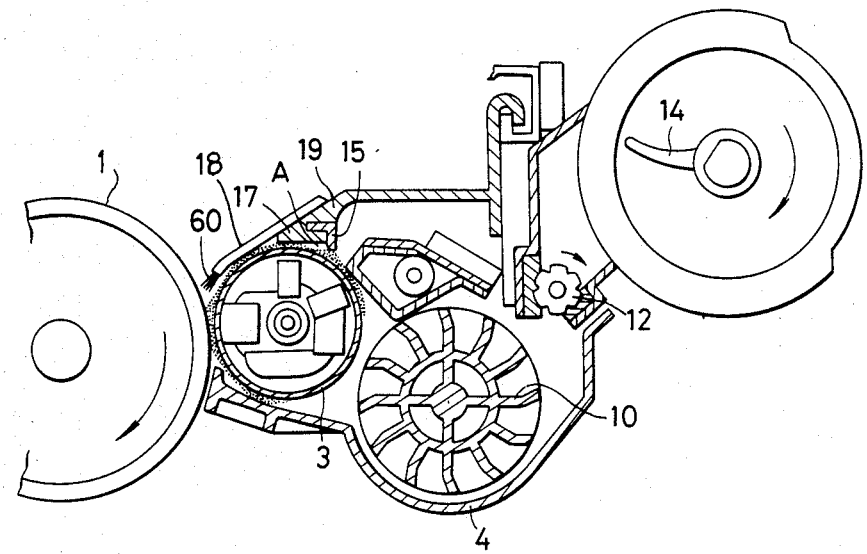
FIG. 10 is a cross-sectional view of a magnetic brush development device according to a fifth embodiment of the present invention.
Figure 11:
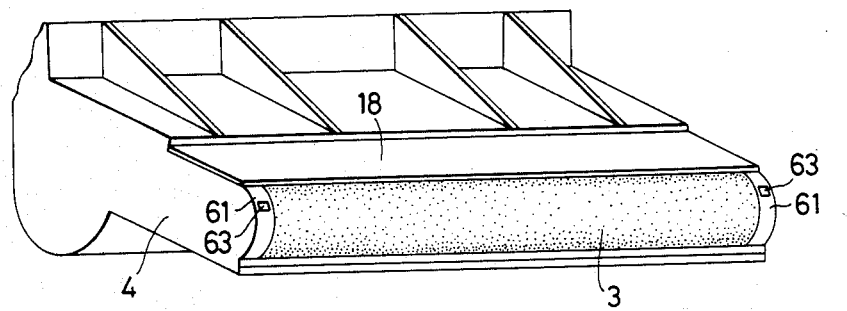
FIG. 11 is a perspective view of a development unit.
Figure 12:
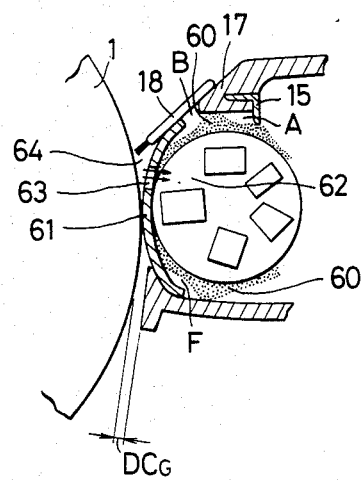
FIG. 12 is a fragmentary cross-sectional view of a device portion in which a development sleeve is mounted.

An inlet seal member 18 extends from an upper edge of a casing opening as shown in FIGS. 6 and 7. However, as shown in FIG. 9, portions 4' of the development casing 4 may extend toward the photosensitive drum 1 to define an air passage, instead of adding a separate inlet seal member.

Figure 13:
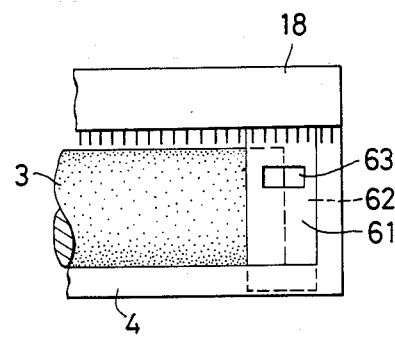
FIG. 13 is a fragmentary front elevational view of the device portion of FIG. 12.

In a fifth embodiment illustrated in FIGS. 10 through 13, a magnetic brush 60 is pressed against the inner surface of the toner fiber limiting plate 17 downstream of the doctor blade 15. The space A defined between the magnetic brush 60 on the development sleeve 3---the doctor blade 15, and the toner fiber limiting plate 17 develops a vacuum therein due to the pumping action of the magnetic brush 60. The vacuum space A opens into spaces defined at the opposite ends of the development sleeve 3, i.e., an inner space 62 in the development unit which is sealed by side seals 61. Air inlets 63 are defined through upper portions of the side seals 61. As shown in FIG. 13, each air inlet 63 extends over both an end of the outer peripheral surface of the development sleeve 3 and the inner space 62 behind one of the side seals 61. The air inlets 63 provide communication between the inner space 62 behind the side seals 61 and an outer space 64 in front of the side seals 61, the outer space 64 being defined between the outer surfaces of the side seals 61 and the inlet seal member 18. The magnetic brush 60 is pressed against the inner surface of the development casing 4 at edges of the opening of thereof downstream of the developing region. The magnetic brush fibers, the photosensitive drum 1, and the development casing 4 jointly define a vacuum space F downstream of the developing region.

The lower edge of the opening of the development casing 4, near the photosensitive drum 1, and the outer peripheral surface of the photosensitive drum 1 are spaced from each other by a gap $DC_G$ which is selected to be in the range of:

$$0.3 \text{ mm} < DC_G \leq 1.0 \text{ mm}$$

In the development device shown in FIGS. 10 through 13, the magnetic brush 60 functions as a pump to keep the spaces A, F under vacuum upon rotation of the development sleeve 3. This fact was experimentally confirmed by measuring a pressure distribution in the development unit.

With the space A kept under vacuum, the spaces at the opposite ends of the development sleeve 3 (i.e., the inner space 62 behind the side seals 61, communicating with the space A) is also kept under vacuum. The vacuum in the inner space 62 causes air in the outer space 64 to flow through the air inlets 63 of the side seals 61 into the inner space 62--i.e., the development unit.

Developer particles floating in the outer space 64 are drawn on such an air flow into the development unit, and hence prevented from being deposited on the side seals 61. The vacuum in the space F causes air outside of the development unit to flow through the gap between the lower edge of the opening of the development casing 4 and the photosensitive drum 1 into the space F---i.e., into the development unit.

The air flow drawn into the development unit prevents toner particles from being scattered out. Since the gap between the lower edge of the opening of the development casing 4 and the photosensitive drum 1 is of a small dimension as defined above, the air flows therethrough at a high speed for effective prevention of scattering-out of the toner particles.

Figure 14:
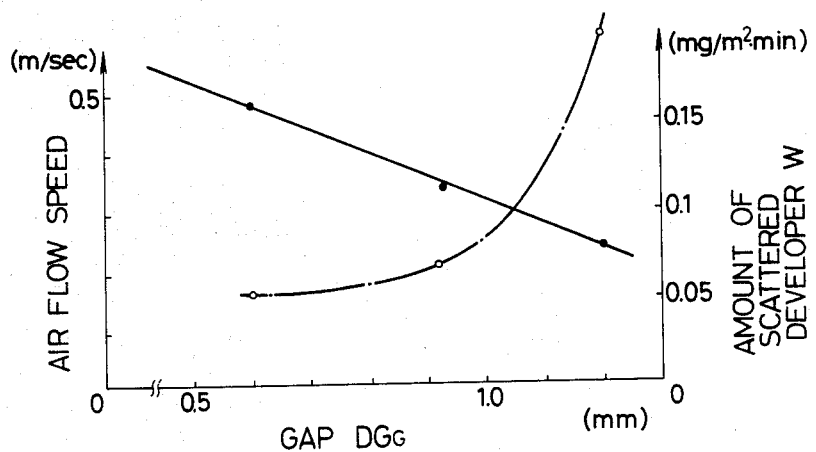
FIG. 14 is a graph showing the speed of an air flow into a development unit and the amount of a scattered developer, both plotted against gaps.

FIG. 14 shows the relationship between the gap dimension $DC_G$ (indicated on the horizontal axis) and the speed V of a drawn air flow and the amount W of scattered developer (indicated on the vertical axes). FIG. 14 clearly indicates that as the gap is reduced, the speed V of the drawn air flow linearly increases as represented by the solid-line curve, and the amount W of the scattered developer decreases along a quadratic curve as represented by the dot-and-dash line. For example, when the gap $DC_G$ is 0.6 mm, the speed V of the drawn air flow is 0.45 m/sec., and the amount W of the scattered developer is 0.055 mg/cm$^2$ min. When the gap $DC_G$ is 1.2 mm, the air flow speed V is reduced by about ½, and the scattered developer amount W is increased about four times. The scattered developer amount W can be reduced to a considerably small extent if the gap $DC_G$ is 1.0 mm or below. It would be highly difficult to reduce the gap $DC_G$ to 0.3 mm or less, and such a reduction in the gap $DC_G$ would not have any significant effect on the prevention of scattering-out of the toner.

By preventing the toner from being scattered out, the carrier is also prevented from being scattered out. As the magnetic brush 60 is pressed against the inner surface of the development casing 4, the air drawn into the casing 4 is prevented from flowing back out, so that the developer is effectively and reliably prevented from scattering out.

Figure 15:
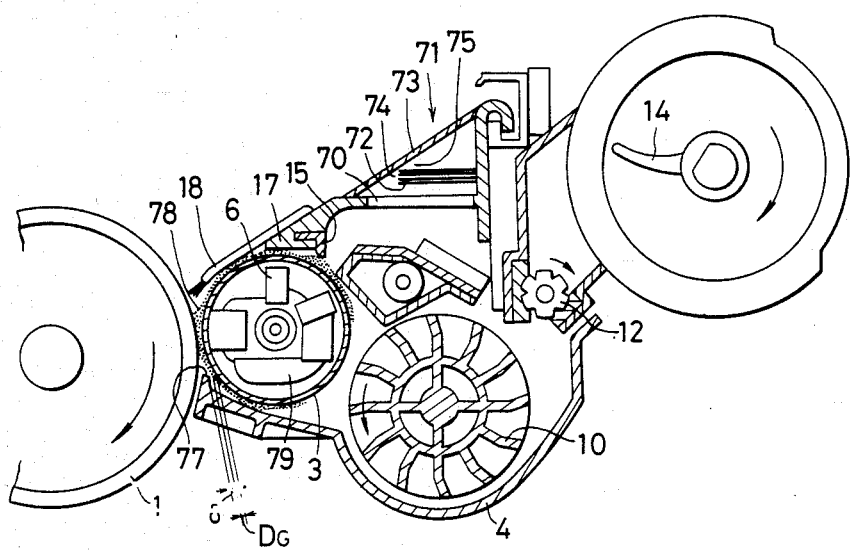
FIG. 15 is a cross-sectional view of a magnetic brush development device according to a sixth embodiment of the present invention.
Figure 16:
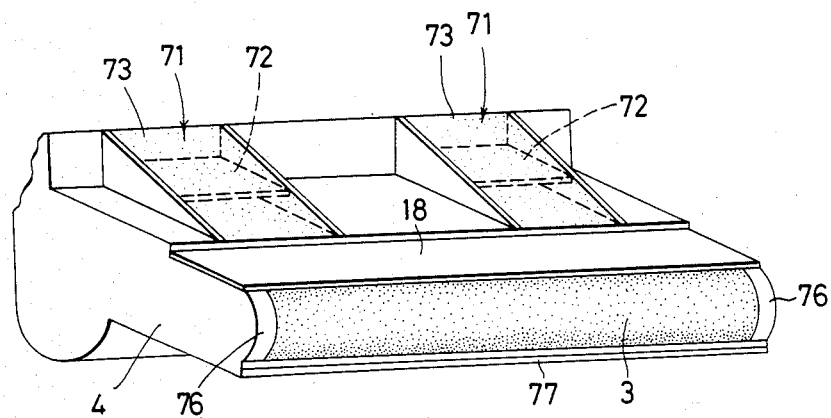
FIG. 16 is a perspective view of a development unit.

FIGS. 15 and 16 illustrate a sixth embodiment in which a pressure relief hole 70 is defined in an upper wall of the development casing 4 for relieving the air pressure in the development casing 4. Two filters 71 that are transversely spaced from each other are disposed above the pressure relief hole 70.

Each of the filters 71 is in the form of a dual structure comprising first and second filters 72, 73. The first filter 72 is disposed directly above the pressure relief hole 70 and may comprise bristles. The first filter 72 has air holes of a diameter which is substantially the same as that of developer particles. The second filter 73 is positioned upwardly of the first filter 72 and has air holes of a diameter smaller than that of developer particles.

The second filter 73 is inclined so as to fully cover the opening above the pressure relief hole 70. The first filter 72 is supported in a cantilevered fashion and extends substantially horizontally toward the inner surface of the second filter 73, the first filter 72 having a distal end located closely to the inner surface of the second filter 73. The distal end of the first filter 72 and the inner surface of the second filter 73 are spaced from each other with a small flow passage 74 defined therebetween. An enlarged passage 75 is defined downstream of the first filter 72--i.e., above the first filter 72.

The development sleeve 3 has a portion exposed from the development casing 4 toward the photosensitive drum 1. The inlet seal member 18 is located upwardly of the exposed portion of the development sleeve 3, and side seals 76 are disposed at the opposite ends of the exposed portion of the development sleeve 3. The inlet seal member 18 and the side seals 76 serve to prevent toner from flowing out of the development casing 4.

A lower edge 77 of the opening of the development casing 4 through which the development sleeve 3 is exposed and the outer peripheral surface of the development sleeve 3 are spaced from each other by a gap $\delta$ which has a certain dimensional relationship to the thickness $D_G$ of a magnetic brush 78 on the development sleeve 3. More specifically, magnetic brush fibers are erected by the magnets 6 disposed in the development sleeve 3, and the magnetic brush 78 has a thickness $D_G$ upstream of an auxiliary pole 79 which produces erected magnetic brush fibers near the lower edge 77 of the development casing 4. The gap $\delta$ is selected to meet the following relationship:

$$\delta - D_G < 1.5 \text{ mm}$$

As the air pressure in the development casing 4 increases, air in the casing 4 flows through the filters 71 out of the casing 4. The air flow contains toner particles which are trapped or repelled in a considerable proportion by the first filters 72, which are relatively coarse, while the speed of the air flow is being reduced thereby. The toner particles that have passed through the first filters 72 are completely trapped or repelled by the second filters 73, which are relatively fine. Since the toner particles are trapped by the dual-filter structure, the filters 72, 73 are clogged very slowly. Almost no toner is allowed to flow out of the casing 4.

An air flow passing through the small flow passage 74 between the first and second filters 72, 73 flows into the enlarged passage 75. The speed of the air flow as it enters the enlarged passage 75 is lowered, since the enlarged passage 75 is larger in cross-sectional area than the small flow passage 74. As a result, the air flows out very slowly, effectively preventing toner from scattering out.

Figure 17:
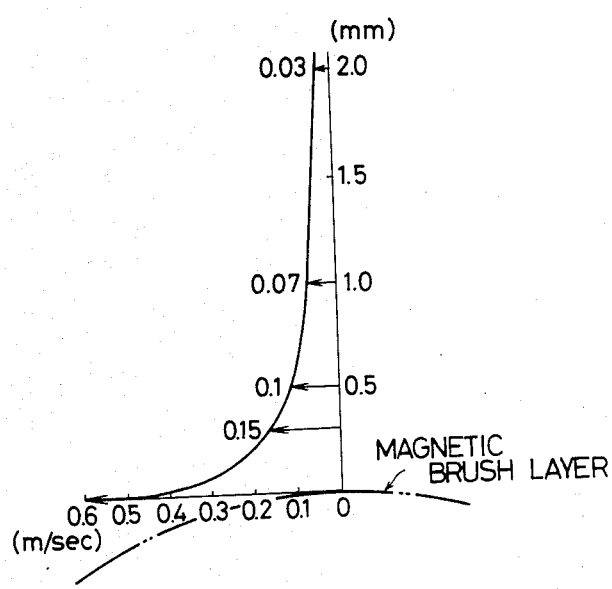
FIG. 17 is a graph showing a wake speed distribution.

An air flow (wake) produced by rotation of the development sleeve 3 has a relatively high speed (indicated on the horizontal axis in FIG. 17) in a region where the distance (indicated on the vertical axis) from the magnetic brush is about 2 mm or less. It may be understood that the wake is produced in such a region. A wake produced by the photosensitive drum 1 is formed in a region wherein the distance from the outer surface of the drum 1 is about 0.05 mm or smaller.

The wakes caused by the development sleeve 3 and the photosensitive drum 1 flow downwardly through the gap therebetween and would tend to pass out of the device across the lower edge 77 of the development casing 4, drawing air out of the development casing 4.

With the gap $\delta$ being selected to meet the relationship: $\delta - D_G < 1.5$ mm as described above, however, the air flow in the casing 4 circulates therein without flowing out to keep the toner confined in the development casing 4, as experimentally confirmed. An experiment indicated that good results were achieved when the speed of the wake was 0.05 m/sec. or higher.

Figure 18:
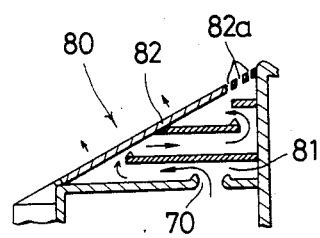
FIG. 18 is a cross-sectional view of a filter structure in a seventh embodiment of the present invention.

FIG. 18 illustrates a seventh embodiment of the present invention. In this embodiment, a filter 80 includes a first filter 81 comprising multiple filter elements, the lowermost filter element extending closely to a second filter 82 of the filter 80. The filter element next to the lowermost one extends from the second filter 82, and the third filter element extends toward the second filter 82.

The first filter 81 thus defines a zigzag cyclone-type elongate air passage for causing an air flow therethrough to be alternately constricted and expanded several times. Therefore, the speed of the air flow through the first filter 81 finally becomes substantially zero, so that the developer is prevented from scattering out highly effectively.

Since the air flow speed in the first filter 81 is substantially reduced to zero, the second filter 82 may be partly formed with relatively large air holes 82a for the purpose of relieving air pressure.

Figure 19:
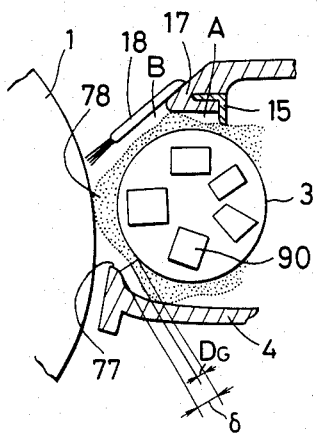
FIG. 19 is a fragmentary cross-sectional view of a magnetic brush development device according to an eighth embodiment of the present invention.

FIG. 19 shows an eighth embodiment in which magnetic brush fibers erected by an auxiliary pole 90 in the development sleeve 3 are pressed against an inner surface of the development casing 4. With this arrangement, even when the filters are clogged and the air pressure in the development unit is increased to cause the wake to flow back, such a reverse flow can be prevented by the magnetic brush fibers pressed against the inner surface of the casing 4, thereby preventing toner from scattering out.

Figure 20:
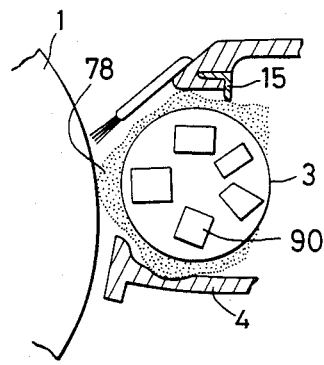
FIG. 20 is a fragmentary cross-sectional view of a magnetic brush development device according to a ninth embodiment of the present invention.
Figure 21:
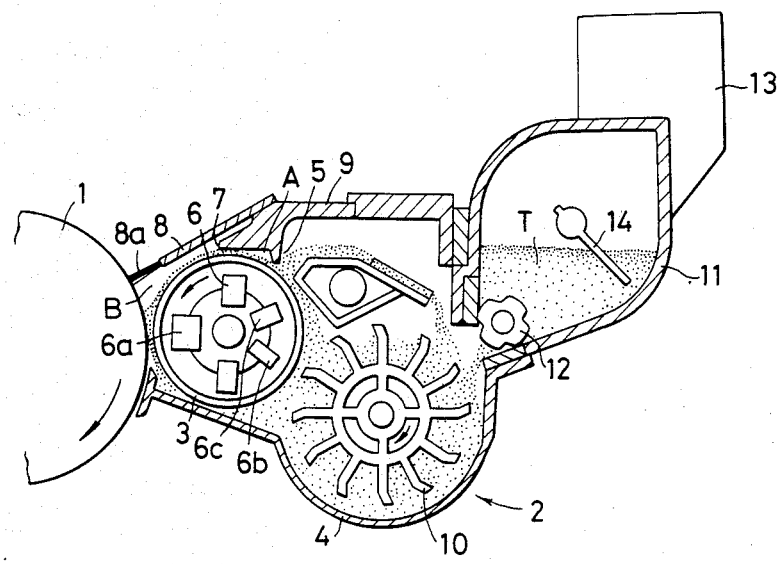
FIG. 21 is a cross-sectional view of a conventional magnetic brush development device.

FIG. 20 also shows a ninth embodiment in which the development casing 4 has a streamlined recess defined in its inner surface in complementary relation to the shape of magnetic brush fibers erected by the auxiliary pole 90. The magnetic brush fibers fitted in the recess of the development casing 4 are more effective in blocking a reverse flow of the wake.

While the magnetic brush development device in each of the above embodiments has been described as being used with a copying machine, the present invention is applicable to other recording apparatus.

Although certain preferred embodiments have been shown and described, it should be understood that many changes and modifications may be made therein without departing from the scope of the appended claims.

We claim:

1. A magnetic brush development device comprising:
   (a) a development sleeve disposed closely to the peripheral surface of an electrostatic latent image carrier;
   (b) a development casing housing said development sleeve and storing a two-component developer;
   (c) a doctor blade disposed closely to the peripheral surface of said development sleeve for limiting the amount of the developer to be supplied to said electrostatic latent image carrier;
   (d) a fiber limiting plate positioned downstream of said doctor blade in the direction of movement of the developer for limiting erected fibers of the developer;

(e) an inlet seal member extending from said development casing toward said electrostatic latent image carrier and having a distal end held against the peripheral surface of said electrostatic latent image carrier; and (f) an air flow passage providing communication between:
  (i) a first space surrounded by said doctor blade, said fiber limiting plate, and a portion of the peripheral surface of said development sleeve and
  (ii) a second space surrounded by said inlet seal member, said fiber limiting plate, a portion of the peripheral surface of said development sleeve, and a portion of the peripheral surface of said electrostatic latent image carrier.

2. A magnetic brush development device according to claim 1, wherein said air flow passage is defined through said fiber limiting plate.

3. A magnetic brush development device according to claim 1, wherein said air flow passage is defined between said fiber limiting plate and said doctor blade.

4. A magnetic brush development device according to claim 1, wherein said air flow passage is defined at an end of said development sleeve.

5. A magnetic brush development device comprising:
(a) a development sleeve disposed closely to the peripheral surface of an electrostatic latent image carrier;
(b) a development casing housing said development sleeve and storing a two-component developer;
(c) a doctor blade disposed closely to the peripheral surface of said development sleeve for limiting the amount of the developer to be supplied to said electrostatic latent image carrier;
(d) a fiber limiting plate positioned downstream of said doctor blade in the direction of movement of the developer for limiting erected fibers of the developer;
(e) an inlet seal member extending from said development casing toward said electrostatic latent image carrier and having a distal end held against the peripheral surface of said electrostatic latent image carrier;
(f) a side seal held in sliding contact with said development sleeve for preventing floating toner particles form leaking out of said development casing;
(g) a first vacuum space surrounded by said fiber limiting plate and a portion of a magnetic brush held against said fiber limiting plate;
(h) a second vacuum space surrounded by the magnetic brush held against the peripheral surface of said electrostatic latent image carrier and a portion of the inner surface of said development casing and by a portion of the inner surface of said development casing in a developing region and downstream of the developing region;
(i) an air inlet formed in said side seal so as to interconnect and inner space connected to said first vacuum space and an outer space; and
(j) an opening formed in said development casing so as to interconnect said second vacuum space and an outer space, said opening having an edge spaced from the peripheral surface of said electrostatic latent image carrier by a cap $DC_G$ selected to be in the range of:

$$0.3 \text{ mm} < DC_G \leq 1.0 \text{ mm}.$$

6. A magnetic brush development device comprising:
(a) a development sleeve disposed closely to the peripheral surface of an electrostatic latent image carrier;
(b) a development casing housing said development sleeve and storing a two-component developer, said development casing having a pressure relief hole for reducing an air pressure therein;
(c) a doctor blade disposed closely to the peripheral surface of said development sleeve for limiting the amount of the developer to be supplied to said electrostatic latent image carrier;
(d) a fiber limiting plate positioned downstream of said doctor blade in the direction of movement of the developer for limiting erected fibers of the developer;
(e) an inlet seal member extending from said development casing toward said electrostatic latent image carrier and having a distal end held against the peripheral surface of said electrostatic latent image carrier; and
(f) a filter disposed in said pressure relief hole for preventing the developer from being scattered out,
(g) wherein the peripheral surface of said electrostatic latent image carrier is spaced from an edge of an opening in said development casing through which said development sleeve is exposed toward said electrostatic latent image carrier by a gap $\sigma$ selected to meet the dimensional relationship:

$$\delta - D_G < 1.5 \text{ mm}$$

where $D_G$ is the thickness of a magnetic brush on said development sleeve.

7. A magnetic brush development device comprising:
(a) a development sleeve disposed closely to the peripheral surface of an electrostatic latent image carrier;
(b) a development casing housing said development sleeve and storing a two-component developer, said development casing having a pressure relief hole for reducing an air pressure therein;
(c) a doctor blade disposed closely to the peripheral surface of said development sleeve for limiting the amount of the developer to be supplied to said electrostatic latent image carrier;
(d) a fiber limiting plate position downstream of said doctor blade in the direction of movement of the developer for limiting erected fibers of the developer;
(e) an inlet seal member extending from said development casing towards said electrostatic latent image carrier and having a distal end held against the peripheral surface of said electrostatic latent image carrier; and
(f) a filter disposed in said pressure relief hole for preventing the developer from being scattered out, said filter being in the form of a dual structure comprising a first inner filter for reducing the speed of an air flow and a second outer filter for preventing the developer from being scattered,
wherein:
(g) the peripheral surface of said electrostatic latent image carrier is spaced from an edge of an opening in said development casing through which said development sleeve is exposed towards said electrostatic latent image carrier by a gap $\sigma$ selected to meet the dimensional relationship:

$$\sigma - D_G < 1.5 \text{ mm}$$

where $D_G$ is the thickness of a magnetic brush on said development sleeve;

(h) said first and second filters have air holes of different sizes, the air holes of said first filter being of substantially the same diameter as that of the particles of the developer and the air holes of said second filter being smaller than the particles of the developer; and (i) said first filter has a distal end extending closely to an inner surface of said second filter, with a small passage defined between the distal end of said first filter and the inner surface of said second filter and an enlarged passage defined downstream of said first filter.

* * * * *

UNITED STATES PATENT AND TRADEMARK OFFICE
CERTIFICATE OF CORRECTION

PATENT NO. : 4,800,411

DATED : JAN 24, 1989

INVENTOR(S) : Masaru TANAKA et al.

It is certified that error appears in the above-identified patent and that said Letters Patent is hereby corrected as shown below:

On the Title Page:

The listing for "Attorney, Agent, or Firm" should read as follows:

-- Oblon, Fisher, Spivak, McClelland & Maier --

Signed and Sealed this

Twenty-fifth Day of April, 1989

Attest:

DONALD J. QUIGG

Attesting Officer

Commissioner of Patents and Trademarks